US009755229B2

(12) United States Patent
Wang et al.

(10) Patent No.: US 9,755,229 B2
(45) Date of Patent: Sep. 5, 2017

(54) INTERMETALLIC M—SN$_5$ (M=FE, CU, CO, NI) COMPOUND AND A METHOD OF SYNTHESIS THEREOF

(75) Inventors: Xiao-Liang Wang, Hayward, CA (US); Weiqiang Han, Ningbo (CN)

(73) Assignee: Brookhaven Science Associates, LLC, Upton, NY (US)

( * ) Notice: Subject to any disclaimer, the term of this patent is extended or adjusted under 35 U.S.C. 154(b) by 714 days.

(21) Appl. No.: 14/125,535

(22) PCT Filed: Jun. 14, 2012

(86) PCT No.: PCT/US2012/042452
§ 371 (c)(1),
(2), (4) Date: Mar. 14, 2014

(87) PCT Pub. No.: WO2012/174235
PCT Pub. Date: Dec. 20, 2012

(65) Prior Publication Data
US 2015/0004490 A1    Jan. 1, 2015

Related U.S. Application Data

(60) Provisional application No. 61/496,630, filed on Jun. 14, 2011.

(51) Int. Cl.
*C22C 13/00*      (2006.01)
*H01M 4/38*       (2006.01)
(Continued)

(52) U.S. Cl.
CPC ............ *H01M 4/387* (2013.01); *C22B 25/04* (2013.01); *C22C 13/00* (2013.01); *H01M 4/366* (2013.01);
(Continued)

(58) Field of Classification Search
None
See application file for complete search history.

(56) References Cited

U.S. PATENT DOCUMENTS

| 5,918,795 A | 7/1999 | Yamaguchi et al. |
| 2007/0111094 A1 | 5/2007 | Thackeray et al. |
| 2010/0119942 A1 | 5/2010 | Kumar |

FOREIGN PATENT DOCUMENTS

| CN | 101665883 | 10/2010 |
| JP | 2008/071635 | 3/2008 |
| KR | 2003/0034688 | 5/2003 |

OTHER PUBLICATIONS

Machine translation of CN 101665883, Aug. 2011.*
(Continued)

*Primary Examiner* — Jonathan Crepeau
(74) *Attorney, Agent, or Firm* — Dorene M. Price; Lars O. Husebo

(57) ABSTRACT

Novel intermetallic materials are provided that are composed of tin and one or more additional metal(s) having a formula $M_{(1-x)}$-$Sn_5$, where $-0.1 \leq x \leq 0.5$, with $0.01 \leq x \leq 0.4$ being more preferred and the second metallic element (M) is selected from iron (Fe), copper (Cu), cobalt (Co), nickel (Ni), and a combination of two or more of those metals. Due to low concentration of the second metallic element, the intermetallic compound affords an enhanced capacity applicable for electrochemical cells and may serve as an intermediate phase between Sn and $MSn_2$. A method of synthesizing these intermetallic materials is also disclosed.

9 Claims, 7 Drawing Sheets

(51) Int. Cl.
   H01M 4/525      (2010.01)
   H01M 4/62       (2006.01)
   H01M 10/0525    (2010.01)
   C22B 3/00       (2006.01)
   H01M 4/36       (2006.01)

(52) U.S. Cl.
   CPC ........... *H01M 4/525* (2013.01); *H01M 4/621* (2013.01); *H01M 10/0525* (2013.01)

(56) References Cited

OTHER PUBLICATIONS

International Search Report of International Application PCT/US/2012/042452 and transmittal—Date mailed: Aug. 14, 2012, 9 pages.
Written Opinion of the Searching Authority of International Application No. PCT/US2012/042452—Date mailed: Aug. 14, 2021, 8 pages.
Winter, M., et al., "Electrochemical Lithiation of Tin and Tin-Based Intermetallics and Composites," *Electrochimica Acta*, vol. 45, pp. 31-50, 1999.
Derrien, G., et al., "Nanostructured Sn—C Composite as an Advanced Anode Material in High-Performance Lithium-Ion Batteries," *Advanced Materials*, vol. 19, pp. 2336 to 2340, 2007.
Obrovac, M., et al., "Alloy Design for Lithium-Ion Battery Anodes," *Journal of Electrochemical Society*, vol. 154, No. 9, pp. A849 to A855, 2007.
Mao, O., et al., "Mechanically Alloyed Sn—Fe (-C) Powders as Anode Materials for Li-ion Batteries II: the Sn—Fe System," *Journal of the Electrochemical Society*, vol. 146, No. 2, pp. 414-422, 1999.
Kepler, K., et al., "$Li_xCu_6Sn_5$ ($0 < x < 13$): An Intermetallic Insertion Electrode for Rechargeable Lithium Batteries," *Electrochemical and Solid-State Letters*, vol. 2, No. 7, pp. 307-309, 1999.
Tarascon, J., et al., "Issues and Challenges Facing Rechargeable Lithium Batteries," *Nature*, vol. 414, pp. 359-367, 2001.
Hassoun, J., et al., "High-Rate, Long-Life Ni—Sn Nanostructured Electrodes for Lithium Ion Batteries," *Advanced Materials*, vol. 19, pp. 1632 to 1635, 2007.
Fan, Q., et al., "Characterization of Amorphous and Crystalline Tin-Cobalt Anodes," *Electrochemical and Solid-State Letters*, vol. 10, No. 12, pp. A274 to A278, 2007.
Vaughey, J., et al., "Substituted $M_xCu_{6-x}Sn_5$ Compounds (M=Fe, Co, Ni, Zn) Designing Multicomponent Intermetallic Electrodes for Lithium Batteries," *Electrochemical and Solid-State Letters*, vol. 10, No. 9, pp. A220 to A224, 2007.
Alcántara, R., et al., "Electrochemical Reaction of Lithium with Nanocrystalline $CoSn_3$," *Electrochemical and Solid-State Letters*, vol. 11, No. 11 pp. A209 to A213, 2008.
Zhang, C., et al., "Preparation and Electrochemical Performances of Nanoscale $FeSn_2$ as Anode Material for Lithium Ion Batteries," *Journal of Alloys and Compounds*, vol. 457, pp. 81-85, 2008.

Beaulieu, L., et al., "The Reaction of Lithium with Sn—Mn—C Intermetallics Prepared by Mechanical Alloying," *Journal of the Electrochemical Society*, vol. 147, No. 9, pp. 3237 to 3241, 2000.
Sakaguchi, H., et al., "Ce—Sn Intermetallic Compounds as New Anode Materials for Rechargeable Lithium Batteries," *Journal of Power Sources*, vols. 119-121, pp. 50-55, 2003.
Xue, M., et al., "Electrochemical Reactions of Lithium with Transition Metal Stannides," *Solid State Ionics* vol. 177, pp. 1501 to 1507, 2006.
Vaughey, J., et al., "Studies of $LaSn_3$ as a Negative Electrode for Lithium-Ion Batteries," *Journal of the Electrochemical Society*, vol. 156, No. 7, pp. A536 to A540, 2009.
Wang, Y., et al., "One-Step Confined Growth of Bimetallic Tin-Antimony Nanorods in Carbon Nanotubes Grown in Situ for Reversible Li+ Ion Storage," *Angewandte Chemie International Edition*, vol. 45, pp. 7039 to 7042, 2006.
Wang, X., et al., "Preparation and Electrochemical Characterization of Tin/Graphite/Silver Composite as Anode Materials for Lithium-Ion Batteries," *Journal of Power Sources*, vol. 184, pp. 508-512, 2008.
Larcher, D., et al., "Electrochemical Reactivity of $Mg_2Sn$ Phases with Metallic Lithium," *Chemistry of Materials*, vol. 16, pp. 5502 to 5511, 2004.
Morcrette, M., et al., "Influence of Electrode Microstructure on the Reactivity of Cu2Sb with Lithium," *Electrochimica Acta*, vol. 52, pp. 5339 to 5345, 2007.
Wang, X., et al., "Single-Crystal Intermetallic M—Sn (M=Fe, Cu, Co, Ni) Nanospheres as Negative Electrodes for Lithium-Ion Batteries," *Applied Materials & Interfaces*, vol. 2, No. 5, pp. 1548 to 1551, and Supporting Information pp. S1 to S5, (2010), [online] retrieved Mar. 11, 2014 from: <URL: http://pubs.acs.org/doi/suppl/10.1021/am100218v>.
Wang, X., et al., "Nanospheres of a New Intermetallic $FeSn_5$ Phase: Synthesis, Magnetic Properties and Anode Performance in Li-ion Batteries," *Journal of the American Chemical Society*, vol. 133, No. 29, pp. 11213 to 11219, 2011.
Wang, X., et al., "$CoSn_5$ Phase: Crystal Structure Resolving and Stable High Capacity as Anodes for Li Ion Batteries," *Journal of Physical Chemistry Letters*, vol. 3, No. 11, pp. 1488 to 1492 and Supporting Information pp. S1 to S5, (2012) [online] retrieved Mar. 12, 2014 from: <URL: http://pubs.acs.org/doi/abs/10.1021/jz300461h>.
Cui, W., et al., "Core-Shell Carbon-Coated $Cu_6Sn_5$ Prepared by in situ Polymerization as a High-Performance Anode Material for Lithium-Ion Batteries," *Journal of Materials Chemistry*, vol. 19, pp. 7202 to 7207, 2009.
Vianco, P., et al., "Assessment of Solder Interconnect Integrity in Dismantled Electronic Components from N57 and B61 Tube-type Radars," Sandia report SAND99-0884, 109 pages and cover page, Jul. 1999.
Spencer, L., et al., "Identity of Trenchmann's 'β-tin' with Stannous Sulphide," *Mineralogical Magazine*, vol. 19, No. 92, pp. 113-123, 1921.
Riesenkampf, et al., "New High-tin Phase Found in Electrolytic Sn—Ni Deposits," *Journal of Materials Science*, vol. 36, No. 19, pp. 4633 to 4636, 2001.

\* cited by examiner

INTERMETALLIC M—SN$_5$ (M=FE, CU, CO, NI) COMPOUND AND A METHOD OF SYNTHESIS THEREOF

CROSS-REFERENCE TO A RELATED APPLICATION

This application is the U.S. National Phase Entry under 35 U.S.C. §371 of International Application No. PCT/US2012/042452, filed Jun. 14, 2012, which claims the benefit under 35 U.S.C. 119(e) of U.S. Provisional Application No. 61/496,630 filed on Jun. 14, 2011, the content of which is incorporated herein in its entirety.

STATEMENT OF GOVERNMENT LICENSE RIGHTS

The present invention was made with government support under contract number DE-AC02-98CH10886 awarded by the U.S. Department of Energy. The United States government may have certain rights in this invention.

FIELD OF THE INVENTION

This invention relates to the field of intermetallic tin-based compounds. In particular, the invention relates to intermetallic M-Sn$_5$ compounds where M is selected from iron (Fe), copper (Cu), cobalt (Co), or nickel (Ni) and a method of synthesizing these compounds by using a modified polyol chemistry.

BACKGROUND

Tin (Sn) undergoes a reversible electrochemical alloying reaction with lithium and offers a high theoretical capacity of 993 mA h g$^{-1}$ or 7313 mA h cm$^{-3}$. Based on this property this material has the potential of replacing conventional graphite (372 mA h g$^{-1}$ or 833 mA h cm$^{-3}$) for negative electrodes in high energy, volume efficient lithium ion batteries. See, for example, Winter, M. et al. *Electrochim. Acta* 1999, 45, 31-50; Derrien, G. et al., *Adv. Mater.* 2007, 19, 2336-2340; and Obrovac, M. N. et al., *J. Electrochem. Soc.* 2007, 154, A849-A855, each of which is incorporated herein by reference in its entirety. However, the electrode undergoes unfavorable structural deterioration due to a huge volume variation between tin and lithium/tin alloy(s). As a result, the cycle life is unacceptable to be used in the lithium ion batteries.

One promising solution to overcome an unacceptable volume variation between tin and lithium/tin alloy(s) that can still take advantage of Sn-based materials for high performance electrodes is to introduce a second metal element (M) to form a tin (Sn) intermetallic compound. (See Mao, O. et al., *J. Electrochem. Soc.* 1999, 146, 414-422; Kepler, K. D. et al., *Electrochem. Solid-State Lett.* 1999, 2, 307-309; Tarascon, J. M. and Armand, M. *Nature* 2001, 414, 359-367; Hassoun, J. et al., *Adv. Mater.* 2007, 19, 1632-1635; Fan, Q. et al., *Electrochem. Solid-State Lett.* 2007, 10, A274-A278; each of which is incorporated herein by reference in its entirety.) The second metal, M, buffers the volume change by forming a soft framework, stabilizes the integration of single intermetallic particle, and enhances the electronic conductivity during cycling, and therefore improves the cell's performance regardless of whether M is electrochemically inactive or electrochemically active.

Electrochemically inactive intermetallic Sn-based compounds include Cu$_6$Sn$_5$ (Vaughey, J. T. et al. *Electrochem. Solid-State Lett.* 2007, 10, A220-A224, incorporated herein by reference in its entirety), CoSn$_3$ (Alcantara, R. et al., *Electrochem. Solid-State Lett.* 2008, 11, A209-A213, incorporated herein by reference in its entirety), Ni$_3$Sn$_4$ (Hassoun, J. et al., 2007), FeSn$_2$ (Zhang, C. Q. et al. *Alloys Compd.* 2008, 457, 81-85, incorporated herein by reference in its entirety), MnSn$_2$ (Beaulieu, L. Y. et al. *J. Electrochem. Soc.* 2000, 147, 3237-3241, incorporated herein by reference in its entirety), CeSn$_3$ (Sakaguchi, H. et al. *J. Power Sources* 2003, 119, 50-55), CrSn$_2$ (Xue, M. Z. et al. *Solid State Ionics* 2006, 177, 1501-1507, incorporated herein by reference in its entirety), and LaSn$_3$ (Vaughey, J. T. et al. *J. Electrochem. Soc.* 2009, 156, A536-A540, incorporated herein by reference in its entirety).

Electrochemically active intermetallic Sn-based compounds include SbSn (Wang, Y. et al. *Angew. Chem., Int. Ed.* 2006, 45, 7039-7042, incorporated herein by reference in its entirety), Ag$_3$Sn (Wang, X. Y. et al. *J. Power Sources* 2008, 184, 508-512, incorporated herein by reference in its entirety), and Mg$_2$Sn (Larcher, D. et al. *Chem. Mater.* 2004, 16, 5502-5511, incorporated herein by reference in its entirety).

Despite the availability of various intermetallic compounds, there is still a need for intermetallic Sn-based compounds that overcome an unacceptable volume variation between tin and lithium/tin alloy(s) by forming a soft framework, by stabilizing the integration of single intermetallic particles, and by enhancing the electronic conductivity during cycling, yet that still avoid significant suppression of the theoretical capacity of pure tin (Sn), which is 993 mA h g$^{-1}$. For example, while FeSn$_2$ has been identified as the best composition among M-Sn (M=Fe, Cu, Co, Ni) nanospheres (Wang, X-L et al. *ACS Appl. Mater. Interfaces* 2010, 2, 1548-1551), the presence of Li-storage-inactive Fe in FeSn$_2$ suppresses the theoretical capacity of pure Sn by about 189 mA h g$^{-1}$ (to 804 mA h g$^{-1}$). Thus, it is desirable to have a tin-based intermetallic compound with the improved theoretical capacity that can match as close as possible to the theoretical capacity of pure tin (Sn).

SUMMARY

A novel intermetallic M-Sn$_5$ (M=Fe, Cu, Co, Ni) compound is disclosed that can either form macroscopic structure or nanostructures composed of a crystal lattice. In a preferred embodiment, the intermetallic tin-based compound(s) forms a tetragonal lattice in the P4/mcc space group. In one embodiment, the lattice has parameters of a=b=6.91369 Å, c=5.88967 Å, and α=β=γ=90°. The morphology of the lattice can be shaped, preferably, into a nanowire, a nanobelt, a nanoparticle, a nanocrystal, a nanorod, a nanotube, a nanocube, or a nanosheet with the size at its shortest cross-section ranging between about 30 and about 500 nm. In one embodiment, the intermetallic compound can be further doped with alkali metals, transition metals, non-metals, or halogens, including, but not limited to, Li, Na, K, B, C, N, F, Al, Si, P.S. Ca, Sc, V, Cr, Mn, Fe, Co, Ni, Cu, and Zn. The present disclosure further describes a method of synthesizing these intermetallic tin-based compounds.

The tin-based intermetallic compound can have a substoichiometric composition of M$_{(1-x)}$-Sn$_5$, where M can be selected from iron (Fe), copper (Cu), cobalt (Co), and nickel (Ni) and x is between about −0.1 and about 0.5, with 0.01 and 0.4 being more preferred. In one exemplary embodiment, the substoichiometric composition of tin-based intermetallic compound has a formula Fe$_{0.74}$Sn$_5$. As provided herein, the fractional subscripts will be omitted when referring to the intermetallic compounds and alloys for convenience of the reader. Thus, for example, the present disclosure will generally refer to $FeSn_5$ for all x values between −0.1 and 0.5, instead of referring to, for example, $Fe_{0.74}Sn_5$ unless specifically indicated. In another exemplary embodiment, the substoichiometric composition of tin-based intermetallic compound has a formula $CoSn_5$, $NiSn_5$ or $CuSn_5$. In yet another exemplary embodiment, the substoichiometric composition of tin-based intermetallic compound has a formula $M1/M2-Sn_5$, where M1 and M2 are selected from Fe, Cu, Co, Ni, but M1 is not the same metal as M2. In this embodiment, M1 atoms in $M1-Sn_5$ compound, e.g., Fe, can be partly substituted by M2 atoms, e.g., Co, thus producing a crystal of, for example, $Fe/Co—Sn_5$. It will be understood by those skilled in the art that other substitutions and additions of a second metal in the present intermetallic tin-based compound are foreseeable without departing from the invention.

The tin-based intermetallic compound can further form nanostructure(s) having a core and a shell. The core has M vacancies and exhibits a single-crystal $M-Sn_5$ nanostructure. The shell is an amorphous structure of M-Sn—O, e.g., Fe—Sn—O, surrounding the single-crystal $M-Sn_5$ nanostructure core. In this embodiment, the core can have a size of about 10-500 nm, and the shell can have a size of about 1-10 nm.

An electrode is disclosed, preferably an anode, composed of a tin-based intermetallic compound, a conductive additive, and a binder. In one embodiment, the composition of the intermetallic compound, additive, and binder is about 60% to 90% of the intermetallic compound, 5% to 30% of additive, and 5% to 15% of binder. In a preferred embodiment the composition of the intermetallic compound, additive, and binder is 80:10:10. The present invention further encompasses an electrochemical cell, i.e., a battery, having a cathode, an anode, and an electrolyte solution. In a preferred embodiment, the electrochemical cell is a lithium-ion battery having an anode composed of a tin-based intermetallic compound of the present invention.

A method is disclosed for synthesizing intermetallic tin-based compound(s) having a formula $M-Sn_5$ employing a modified polyol wet-chemistry method. The method includes preparing a template of tin material, e.g., nanospheres, by reducing a tin precursor with a reducing agent in a solvent with or without one or more surfactants under ambient or slightly elevated temperature(s), i.e., 0° C. to 250° C., for a period of 1 minute (min) to 24 hours. The method further includes combining the prepared tin template with an iron, copper, cobalt, or nickel precursor in the same solvent under ambient or slightly raised temperature to produce an intermetallic $FeSn_5$, $CoSn_5$, $CuSn_5$, $NiSn_5$, or a combination thereof. In one embodiment, the molar ratio of M to Sn in the precursors is between about 0.01 and about 0.3.

These and other characteristics of the intermetallic tin-based compound and a method of synthesis thereof will become more apparent from the following description and illustrative embodiments which are described in detail with reference to the accompanying drawings. Similar elements in each figure are designated by like reference numbers and, hence, subsequent detailed descriptions thereof may be omitted for brevity.

DETAILED DESCRIPTION

Novel intermetallic materials are described that are composed of tin and one or more additional metal having a formula (1), $$M_{(1-x)}\text{-}Sn_5, \qquad (1)$$

where −0.1≤x≤0.5, with 0.01≤x≤0.4 being more preferred, and a second metallic element (M) is selected from iron (Fe), copper (Cu), cobalt (Co), nickel (Ni), or a combination of two or more metals, with iron (Fe) being preferred. Due to low concentration of the second metallic element, the intermetallic compound affords an enhanced capacity and may serve as an intermediate phase between Sn and $FeSn_2$. While the intermetallic compound can form macroscopic materials or nanomaterials, the nanomaterials are more preferable and include nanowires, nanobelts, nanoparticles, nanocrystals, nanorods, nanotubes, nanocubes, and nanosheets.

In a preferred embodiment, the shortest cross-section of the nanomaterial is from 10 nm to 500 nanometers, with about 20 nm to about 80 nm being more preferred. The nanomaterials can have a crystal structure of formula (1) with or without an amorphous shell. The present material can be used in electrodes such that the electrodes are made from the intermetallic macroscopic materials or nanomaterials of formula (1); and electrochemical systems can use such electrodes. In addition, a method of synthesizing the intermetallic materials of formula (1) is disclosed. It is to be understood, however, that those skilled in the art may develop other combinatorial, structural, and functional modifications without significantly departing from the scope of the instant disclosure.

I. Intermetallic Tin-Based Material(s)

The present intermetallic tin-based material(s) can form macrostructures or nanostructures that at a minimum include a crystal of a tin-based intermetallic compound having a composition of $M_{(1-x)}$-$Sn_5$ where M can be selected from iron (Fe), copper (Cu), cobalt (Co), or nickel (Ni) and x is between about −0.1 and about 0.5, with 0.01 and 0.4 being more preferred. The M occupancy in the intermetallic $M_{(1-x)}$-$Sn_5$ compound has a Sn/M molar ratio of about 5 to about 10. The upper range of Sn/M molar ratios, e.g., about 10, indicates a non-stoichiometry of the intermetallic $M_{(1-x)}$-$Sn_5$ compound and the presence of vacancies at M sites. In one embodiment, M vacancies are disordered. In a preferred embodiment, the substoichiometric composition of intermetallic compound has a formula $Fe_{0.74}Sn_5$. In another exemplary embodiment, the substoichiometric composition of intermetallic compound has a formula $Co_{0.63}Sn_5$.

Figure 2A:
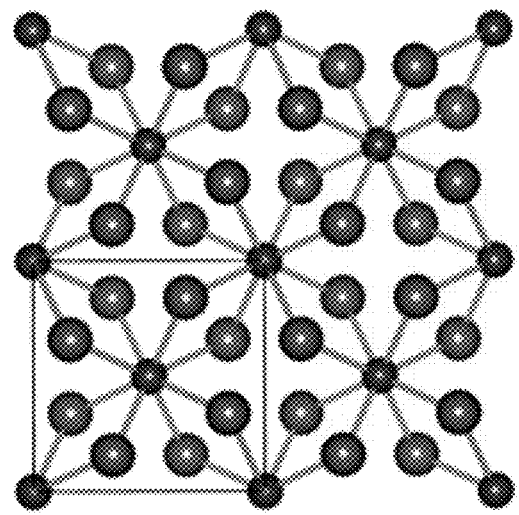
FIGS. 2A and 2B illustrate the crystal structures of $Fe_{0.74}Sn_5$ and $FeSn_2$, respectively, viewed from the [001] direction.

The substoichiometric composition of tin-based intermetallic compound can also have a formula of M1/M2-$Sn_5$, M1/M2/M3-$Sn_5$ or even M1/M2/M3/M4-$Sn_5$ where M1, M2, M3, and M4 are selected from Fe, Cu, Co, and Ni and M1≠M2≠M3≠M4. For example, if M1 atom is an iron (Fe) in tin-based intermetallic compound as illustrated in FIG. 2A, it can be partly substituted by M2 atom, which is cobalt (Co), to produce an intermetallic crystal having a formula of $Fe_x/Co_y$—$Sn_5$, where x+y≈1−(−0.1 . . . 0.5), with x+y≈1−(0.01 . . . 0.4) being more preferred. The intermetallic compound can further be doped with alkali metals, transition metals, non-metals, or halogens, including, but not limited to, Li, Na, K, B, C, N, F, Al, Si, P.S. Ca, Sc, V, Cr, Mn, Fe, Co, Ni, Cu, and Zn.

While there is no specific requirement for how the metal elements must be arranged in the intermetallic compound, as long as it is a crystal, in a preferred embodiment the M-$Sn_5$ crystal has a tetragonal lattice in the P4/mcc space group. In one embodiment, the parameters of the tetragonal lattice can include a=b=6.91369 Å, c=5.88967 Å, and α=β=γ=90° for $FeSn_5$. In another embodiment, the parameters of the tetragonal lattice can include a=b=6.90567 Å, c=5.85077 Å, and α=β=γ=90° for $CoSn_5$. Each M atom in the intermetallic M-$Sn_5$ crystal lattice is surrounded by eight Sn atoms that form an Archimedian square antiprism. The scarcity of M in $MSn_5$ leads to a quasi-one-dimensional (quasi-1D) crystal structure that can serve as one intermediate phase between Sn and $MSn_2$. e.g., $FeSn_2$. Without being bound by theory, it is believed that the thermal expansion of lattice constants of M-$Sn_5$ nanospheres is highly anisotropic with the blocking temperature ($T_B$) of the nanospheres as high as 300 K due to its high magnetocrystalline anisotropy constant. In one exemplary embodiment, the $FeSn_5$ nanospheres are canted antiferromagnets with weak in-plane magnetic coupling.

The present intermetallic tin-based material(s) can also form nanostructures having a core and a shell arrangement. The core has M vacancies and exhibit a single-crystal M-$Sn_5$ nanostructure. The shell is an amorphous structure of M-Sn—O, e.g., Fe—Sn—O, surrounding the single-crystal M-$Sn_5$ nanostructure core. The core and the shell, typically, have the size and shape that is near or almost the same as that of the starting tin template material with a volume expansion of 1-10% during the conversion of tin into M-$Sn_5$ material. Preferably, the ordered atomic arrangement of the intermetallic material is identical throughout the whole particle, without any indication of grain boundaries. The core can have a size ranging from a few to several hundred nanometers. In a preferred embodiment, the core has a diameter, as measured across the shortest cross-section, of about 10 nm to about 500 nm, with about 20 nm to about 80 nm being more preferred. The outer shell surrounding the intermetallic core of the nanomaterial is amorphous, i.e., non-crystalline, having one or more oxidized layers that has a plurality of species including M, Sn, and O. In a preferred embodiment, the number of the oxidized layers ranges from 1 to 30, with 1 to 10 being more preferred and 1 to 5 being most preferred. While there is no specific requirement for how many oxidized layers the intermetallic compound has, it is preferable that the width of the shell remain between about 1 nm and 10 nm, but preferably less than about 5 nm.

II. Electrodes and Electrochemical Cells

As with most batteries, the electrochemical cell has an outer case made of metal or other material(s) or composite(s). The electrochemical cell is preferably a non-aqueous battery. The case holds a positive electrode (cathode), a negative electrode (anode), a separator, and an electrolytic solution, where the intermetallic material(s) of the present invention can be used in production of the anode.

Without being bound by theory, it is believed that by lowering the concentration of the second metal element in the intermetallic material(s), one can effectively enhance the cell performance of M-Sn intermetallic anodes in Li-ion batteries. Preferably, the anode is composed of a tin-based intermetallic compound, a conductive additive, and a binder. The composition of the intermetallic compound, additive, and binder is about 60% to 80% of the intermetallic compound, 10% to 30% of additive, and 5% to 15% of binder. In a preferred embodiment the composition of the intermetallic compound, additive, and binder is 80:10:10. The present invention further encompasses an electrochemical cell, i.e., a battery, having a cathode, an anode, and an electrolyte solution. In a preferred embodiment, the electrochemical cell is a lithium-ion battery having an anode including a tin-based intermetallic compound of the present invention.

In one embodiment, both the anode and cathode are materials into which and from which lithium can migrate. For example, when the battery charges, ions of lithium move through the electrolyte from the positive electrode to the negative electrode and attach to the electrode material, often carbon. During discharge, the lithium ions move back to the cathode from the anode. Inside the case these sheets are submerged in an organic solvent that acts as the electrolyte. The electrolyte is composed of one or more salts, one or more solvents, and, optionally, one or more additives.

The electrode, either the anode or the cathode, although anode is preferred, may include at least one of the intermetallic macroscopic materials or nanomaterials having a formula $M_{(1-x)}Sn_5$, where x is between −0.1 and 0.5, with 0.01 and 0.4 being more preferred and M is selected from Fe, Co, Cu, Ni, and a combination thereof. With specific reference to the anode, it may further comprise a conductive additive such as a carbon- or lithium-based alloy. The carbon may be in the form of graphite such as, for example, mesophase carbon microbeads (MCMB). Lithium metal anodes may be lithium mixed metal oxide (MMOs) such as $LiMnO_2$ and $Li_4Ti_5O_{12}$. Alloys of lithium with transition or other metals (including metalloids) may be used, including LiAl, LiZn, $Li_3Bi$, $Li_3Cd$, $Li_3Sd$, $Li_4Si$, $Li_{4.4}Pb$, $Li_{4.4}Sn$, $LiC_6$, $Li_3FeN_2$, $Li_{2.6}Co_{0.4}N$, $Li_{2.6}Cu_{0.4}N$, and combinations thereof. The anode may further comprise an additional material such as a metal oxide including SnO, $SnO_2$, GeO, $GeO_2$, $In_2O$, $In_2O_3$, PbO, $PbO_2$, $Pb_2O_3$, $Pb_3O_4$, $Ag_2O$, AgO, $Ag_2O_3$, $Sb_2O_3$, $Sb_2O_4$, $Sb_2O_5$, SiO, ZnO, CoO, NiO, FeO, and combinations thereof. The anode may further comprise a polymeric binder. In a preferred embodiment, the binder may be polyvinylidene fluoride, styrene-butadiene rubber, polyamide or melamine resin, and combinations thereof.

With specific reference to the cathode, it may include one or more lithium metal oxide compound(s) with or without the intermetallic material. In particular, the cathode may comprise at least one lithium mixed metal oxide (Li-MMO). Lithium mixed metal oxides contain at least one other metal selected from the group consisting of Mn, Co, Cr, Fe, Ni, V, and combinations thereof. For example the following lithium MMOs may be used in the cathode: $LiMnO_2$, $LiMn_2O_4$, $LiCoO_2$, $Li_2Cr_2O_7$, $Li_2Cra_4$, $LiNiO_2$, $LiFeO_2$, $LiNi_xCo_{1-x}O_2$ (0<x<1), $LiFePO_4$, $LiMn_zNi_{1-z}O_2$ (0<z<1; $LiMn_{0.5}Ni_{0.5}O_2$), $LiMn_{0.33}Co_{0.33}Ni_{0.33}O2$, $LiMc_{0.5}Mn_{1.5}O_4$, where Mc is a divalent metal; and $LiNi_xCo_yMe_zO_2$ where Me may be one or more of Al, Mg, Ti, B, Ga, and Si and 0<x, y, z<1. Furthermore, transition metal oxides such as $MnO_2$ and $V_2O_5$; transition metal sulfides such as $FeS_2$, $MoS_2$, and $TiS_2$; and conducting polymers such as polyaniline and polypyrrole may be present. The preferred positive electrode material is the lithium transition metal oxide, including, especially, $LiCoO_2$, $LiMn_2O_4$, $LiNi_{0.8}Co_{0.15}Al_{0.05}O_2$, $LiFePO_4$, and $LiNi_{0.33}Mn_{0.33}Co_{0.33}O_2$. Mixtures of such oxides may also be used. Similar to the anode, the cathode may further comprise a polymeric binder. In a preferred embodiment, the binder may be polyvinylidene fluoride, styrene-butadiene rubber, polyamide or melamine resin, and combinations thereof.

Although the preferred embodiment has been described with reference to lithium ion-based electrochemical cells, it is also envisioned that the intermetallic materials of the present invention can be successfully applied to other electrochemical cells, such as hybrid electrochemical cells (HEC), supercapacitors, fuel cells, and other conductors.

III. Synthesis of the Intermetallic Tin-Based Materials

The present invention further encompasses a method for synthesizing intermetallic tin-based compound(s) having a formula $M-Sn_5$ employing a modified polyol wet-chemistry method. The method includes preparing a template of tin material, e.g., nanospheres, by reducing a tin precursor with a reducing agent in a solvent with or without one or more surfactants under ambient or slightly elevated temperature(s), i.e., 0° C. to 250° C., for a period of 1 min to 24 hrs, with a preferred range of 1 min to 2 hrs. In this embodiment, the tin precursor may include, but is not limited to, tin(II) chloride ($SnCl_2$), tin(IV) chloride ($SnCl_4$), tin(II) sulfate ($SnSO_4$), tin(IV) sulfate ($Sn(SO_4)_2$), and tin (II) acetate ($Sn(C_2H_3O_2)_2$). The reducing agent may include sodium borohydride ($NaBH_4$) and lithium aluminum hydride ($LiAlH_4$). The solvent can be selected from tetraethylene glycol (TTEG; $HO(CH_2CH_2O)_3CH_2CH_2OH$), hexane ($C_6H_{14}$), toluene ($C_6H_5CH_3$), chloroform ($CHCl_3$), water ($H_2O$), ethylene glycol (EG; $C_2H_6O_2$), triethylene glycol (TEG; $C_6H_{14}O_4$), and a combination thereof. The surfactant may include polyvinylpyroolidone (PVP), poly (2-ethyl-2-oxazoline) (PEtOx), n-dodecyl trimethyl ammonium bromide, diethylene glycol octadecyl ether, and polypropylene glycol)-block-poly(ethylene glycol)-block-(poly (prolylene glycol)) (or PEG-PPG).

The method further includes combining the prepared tin template with an iron, copper, cobalt, or nickel precursor in the same solvent under ambient or slightly raised temperature for a period of 1 min to 24 hrs to produce an intermetallic $FeSn_5$, $CoSn_5$, $CuSn_5$, $NiSn_5$, or a combination thereof. The preferred range is 10 min to 3 hrs. The iron precursor may include iron(III) chloride ($FeCl_3$), iron(II) chloride ($FeCl_2$), iron(III) nitrate ($Fe(NO_3)_3$), iron(II) sulfate ($FeSO_4$), iron(III) phosphate ($FePO_3$), iron(II) acetate ($Fe(C_2H_3O_2)_2$), and iron pentacarbonyl ($Fe(CO)_5$). Cobalt precursors include cobalt(II) acetate ($Co(C_2H_3O_2)_2$), cobalt(II) acetylacetonate ($Co(C_5H_7O_2)_2$), cobalt(II) carbonate ($CoCO_3$), cobalt(II) chloride hexahydrate ($CoCl_2.6H_2O$), cobalt(II) chloride ($CoCl_2$), cobalt(II) nitrate hexahydrate ($CoNO_3.6H_2O$), cobalt(II) perchlorate hexahydrate ($Co_2ClO_4.6H_2O$), cobalt(II) sulfate ($CoSO_4$), and cobalt(III) acetylacetonate ($Co(C_5H_7O_2)_3$). Nickel precursors include nickel(II) acetylacetonate ($Ni(C_5H_7O_2)_2$), nickel(II) chloride ($NiCl_2$), nickel(II) chloride hexahydrate ($NiCl_2.6H_2O$), nickel(II) nitrate hexahydrate ($NiNO_3.6H_2O$) and nickel(II) sulfate ($NiSO_4$). Copper precursors include copper(I) chloride (CuCl), copper(I) acetate ($CuC_2H_3O_2$), copper(II) acetate ($Cu(C_2H_3O_2)_2$), copper(II) acetylacetonate ($Cu(C_5H_7O_2)_2$), copper(II) chloride ($CuCl_2$), copper(II) nitrate trihydrate ($Cu(NO_3)_2.3H_2O$), and copper(II) sulfate ($CuSO_4$). In a preferred embodiment, the molar ratio of M to Sn in the precursors is between 0.01 and 0.3. In other words, for every M-type precursor, about 5 to 7 equivalents of Sn precursor are provided.

Without being bound by theory, it is believed that the final intermetallic material produced after the second step generally retains the shape and size of the tin template prepared after the first reduction step, or exhibits only a small change with a volume expansion of 1-10% during the conversion of tin into $M-Sn_5$ material. In addition, the process may produce an oxidized amorphous shell, i.e., M-Sn—O, surrounding the crystal lattice of the $M-Sn_5$ material.

While the intermetallic materials and the electrodes and electrochemical cells based on such materials have been described in connection with what is presently considered to be the most practical and preferred embodiment, it is to be understood that the invention is not to be limited to the disclosed embodiments, but on the contrary, is intended to cover various modifications and equivalent arrangements included within the spirit and scope of the appended claims.

EXAMPLES

The examples set forth below also serve to provide further appreciation of the invention but are not meant in any way to restrict the scope of the invention.

Example 1

The $Fe_{0.74}Sn_5$ nanospheres were obtained via two reaction steps. The first step involved synthesizing templates of uniform tin nanospheres by the reduction of $SnCl_2$ (anhydrous, 99% min, Alfa) at 170° C. using a reducing agent $NaBH_4$ (98%, Alfa) in tetraethylene glycol (TEG, 99%, Alfa) solvent under surface stabilizers polyvinylpyroolidone (PVP; MW=360,000, Aldrich) and poly(2-ethyl-2-oxazoline) (PEtOx, MW=50,000, Alfa). 0.525 g of PVP and 0.225 g of PEtOx were dissolved in 11.25 mL of TEG. Then the solution was heated to 170° C. and a $SnCl_2$ solution (0.0975 g in 1 mL of TEG) was mixed. After about 10 min, a fresh $NaBH_4$ solution (0.198 g in 6 mL of TEG) was added, drop by drop. Tin colloids quickly formed upon the addition of $NaBH_4$, causing the mixture to turn black. The synthesis was performed with vigorous stirring in a three-neck flask that was filled with argon atmosphere via a Schlenk line.

The second step was converting the tin template into $Fe_{0.74}Sn_5$ intermetallic nanospheres. A $FeCl_3$ solution (0.008 g in 1 mL of TEG) was added to the tin template suspension at 170° C., waiting for 10 min, and then holding it at 205°

C. for 2 hours. The resulting nanospheres were collected by centrifugation and washed with ethanol.

Example 2

The X-ray diffraction (XRD) experiments on the synthesized Fe—Sn samples (see Example 1) were carried out on beamline X14A ($\lambda=0.72958$ Å) of the National Synchrotron Light Source (NSLS) at Brookhaven National Laboratory. The diffraction patterns were collected in a Q-range from 0.5 to 8.7 Å$^{-1}$, with a Si strip detector at a 0.005° step size. XRD patterns were analyzed using the software Jade 6.5 (Materials Data Incorporated), Jana 2006 (Petricek, V., Dusek, M., & Palatinus, L., 2006), and Superflip (Palatinus L., Chapuis G. 2007, *J. Appl. Cryst.* 40, 786-790).

Figure 1A:
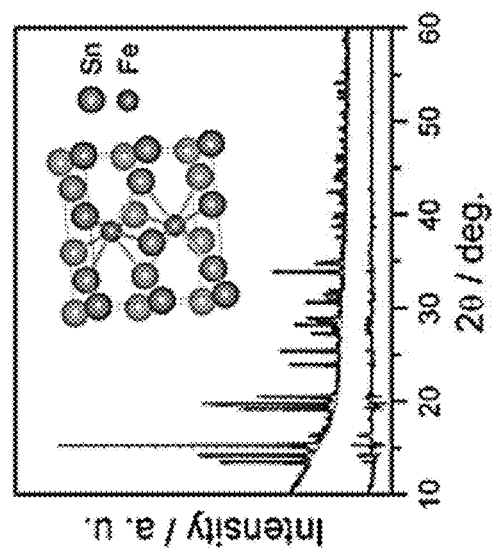
FIG. 1A shows synchrotron X-ray diffraction (XRD) pattern and Rietveld refinement of $Fe_{0.74}Sn_5$. (the inset illustrating the crystal structure of $Fe_{0.74}Sn_5$)
Figure 1B:
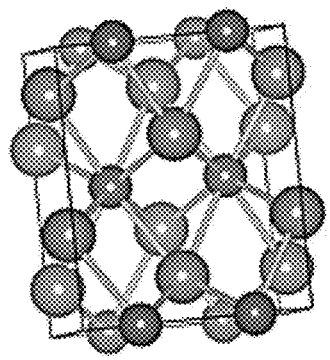
FIG. 1B illustrates a crystal structure of $FeSn_2$.

The crystal structure was solved from synchrotron powder XRD data using the charge flipping method, which has been successfully applied to structural solution from powder XRD data as shown in FIG. 1A. In particular, the space group and lattice constants were obtained from the indexing of the XRD pattern of the synthesized Fe—Sn compound. With these parameters from the indexing, atomic coordinates were determined through structural solution by the charge-flipping method. A Rietveld refinement of the XRD pattern was then performed using the solved structure, during which the lattice parameters, thermal factors, atomic coordinates, and occupancies were allowed to be refined.

Differing from known Fe—Sn phases (including room-temperature FeSn and FeSn$_2$ phases, and high temperature Fe$_5$Sn$_3$ and Fe$_3$Sn$_2$ phases), the FeSn$_5$ phase had a tetragonal lattice in the P4/mcc space group. In addition, the Rietveld refinement of Fe occupancy in the sample yielded a Sn/Fe molar ratio of 6.8, which is indicative of the presence of vacancies at Fe sites. This non-stoichiometry is further supported by the findings from scanning transmission electron microscopy-energy dispersive X-ray spectroscopy (STEM-EDS) with a spot size of 0.7 nm, which return a similar Sn/Fe of 7.0. Moreover, the fact that there are not any extra peaks in the XRD pattern suggests that Fe vacancies are disordered. A calculated partial reflection table containing the index, d-spacing and relative intensity information of Fe$_{0.74}$Sn$_5$ is summarized in Table 1.

TABLE 1

A calculated partial reflection table containing the index, d-spacing and relative intensity information of Fe$_{0.74}$Sn$_5$

| Plane Index | | | d-space | |
|---|---|---|---|---|
| h | k | l | (Å) | I$_{(211)}$ |
| 1 | 0 | 0 | 6.91372 | 2.2976 |
| 1 | 1 | 0 | 4.88874 | 3.8671 |
| 2 | 0 | 0 | 3.45686 | 1.9515 |
| 2 | 1 | 0 | 3.09191 | 29.0535 |
| 0 | 0 | 2 | 2.94467 | 43.1326 |
| 2 | 1 | 1 | 2.73757 | 99.9998 |
| 1 | 0 | 2 | 2.70918 | 2.0006 |
| 1 | 1 | 2 | 2.52243 | 3.979 |
| 2 | 2 | 0 | 2.44437 | 1.4077 |
| 3 | 0 | 0 | 2.30457 | 1.0547 |
| 2 | 0 | 2 | 2.24163 | 0.9285 |
| 3 | 1 | 0 | 2.18631 | 34.3753 |
| 2 | 1 | 2 | 2.13235 | 47.4433 |
| 3 | 1 | 1 | 2.04963 | 33.2834 |
| 3 | 2 | 0 | 1.91752 | 0.9383 |
| 2 | 2 | 2 | 1.8808 | 0.0795 |
| 3 | 2 | 1 | 1.82331 | 0.5517 |
| 3 | 0 | 2 | 1.81485 | 0.3555 |
| 3 | 1 | 2 | 1.75538 | 18.3496 |

TABLE 1-continued

A calculated partial reflection table containing the index, d-spacing and relative intensity information of Fe$_{0.74}$Sn$_5$

| Plane Index | | | d-space | |
|---|---|---|---|---|
| h | k | l | (Å) | I$_{(211)}$ |
| 4 | 0 | 0 | 1.72843 | 0.0308 |
| 4 | 1 | 0 | 1.67682 | 0.0621 |
| 2 | 1 | 3 | 1.65729 | 23.336 |
| 3 | 3 | 0 | 1.62958 | 0.0457 |
| 4 | 1 | 1 | 1.61273 | 0.6462 |
| 3 | 2 | 2 | 1.60686 | 0.2859 |
| 4 | 2 | 0 | 1.54596 | 12.0742 |
| 4 | 2 | 1 | 1.4953 | 19.2061 |
| 4 | 0 | 2 | 1.49062 | 1.8727 |
| 0 | 0 | 4 | 1.47233 | 9.0883 |
| 3 | 1 | 3 | 1.46069 | 12.7922 |
| 4 | 1 | 2 | 1.45713 | 0.7814 |
| 1 | 0 | 4 | 1.44004 | 0.1275 |
| 3 | 3 | 2 | 1.42581 | 0.7464 |
| 1 | 1 | 4 | 1.40979 | 0.0073 |
| 4 | 3 | 0 | 1.38274 | 4.3444 |
| 5 | 0 | 0 | 1.38274 | 8.6628 |
| 3 | 2 | 3 | 1.37173 | 0.2089 |
| 4 | 2 | 2 | 1.36878 | 4.8223 |
| 5 | 1 | 0 | 1.35589 | 0.1261 |
| 2 | 0 | 4 | 1.35459 | 0.0388 |
| 4 | 3 | 1 | 1.34614 | 6.5926 |
| 2 | 1 | 4 | 1.32931 | 4.8605 |
| 5 | 1 | 1 | 1.32133 | 0.0008 |
| 5 | 2 | 0 | 1.28385 | 0.0214 |
| 4 | 1 | 3 | 1.27501 | 0.1451 |
| 2 | 2 | 4 | 1.26121 | 0.2255 |
| 5 | 2 | 1 | 1.25439 | 1.0263 |
| 5 | 0 | 2 | 1.25162 | 17.4774 |
| 4 | 3 | 2 | 1.25162 | 11.6573 |
| 3 | 0 | 4 | 1.24074 | 0.1088 |
| 5 | 1 | 2 | 1.2316 | 0.1048 |
| 4 | 4 | 0 | 1.22218 | 0.3474 |
| 3 | 1 | 4 | 1.22123 | 12.1489 |
| 4 | 2 | 3 | 1.21456 | 8.9362 |

Figure 2B:
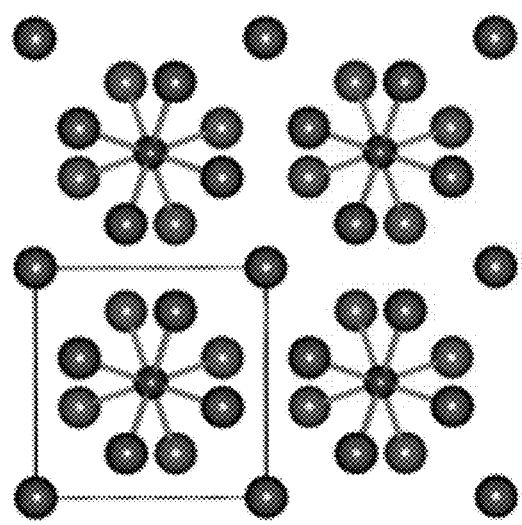

The lattice parameters of Fe$_{0.74}$Sn$_5$ were refined as a=b=6.91369 Å, c=5.88967 Å, and $\alpha=\beta=\gamma=90°$, with a weighted R-factor R less than 3%. The atomic coordinates of the Fe atoms and Sn atoms are as follows: Fe (½, ½, ¼), Sn1 (0, 0, ½), and Sn2 (0.190, 0.607, ½). The crystal structure of FeSn$_5$ shares a lot of similarities with that of FeSn$_2$. Besides the same tetragonal lattice and similar lattice constants (for FeSn$_2$, a=b=6.534 Å and c=5.326 Å), there is only one Fe position in each structure. In both cases, each Fe atom is surrounded by eight Sn atoms that form an Archimedian square antiprism as shown in FIGS. 2A and 2B where the bonds between Fe atoms and nearest Sn atoms are shown. The distances between the Fe atom and the Sn atoms are similar with 2.70347 Å for FeSn$_5$ and 2.79582 Å for FeSn$_2$. Moreover, the distances between two nearest Fe atoms d$_{Fe-Fe}$ are both c/2, i.e., 2.94484 Å for FeSn$_5$ and 2.66300 Å for FeSn$_2$.

As illustrated in FIGS. 2A and 2B, if the eight corner Sn atoms and the four edge Sn atoms in FeSn$_5$ on c-axis are substituted with eight edge Fe atoms on c-axis (two Fe atoms on one edge), the crystal structure of FeSn$_5$ may evolve into that of FeSn$_2$. The change of the atom number in the unit cell also supports this evolution; there are in total one corner Sn atom and one edge Sn atom (considering the share of atoms among neighboring unit cells) in FeSn$_5$ that are replaced by two edge Fe atoms, which results in four Fe atoms and eight Sn atoms in the new unit cell, i.e., FeSn$_2$. Accordingly, it is likely that FeSn$_5$ is one intermediate phase between Sn and FeSn$_2$. The scarcity of Fe in FeSn$_5$ leads to an important feature of its crystal structure—quasi-one-dimension as illustrated in the inset of FIG. 1A. Without being bound by theory, it is believed that in the unit cell, the Sn atoms on the corners and in the middle of c-axis edges form a unidirectional metallic bonding. Moreover, Fe atoms align along the c-axis, and they probably have much weaker (if any) direct bonding with Fe atoms in neighboring unit cells in the a-b plane. The shortest distance between Fe atoms in neighboring unit cells is 6.91369 Å, which is equal to the lattice constant a.

Example 3

The low temperature experiments on the synthesized Fe—Sn samples (see Example 1) were conducted with a displex cryostat (ADP Cryogenics). The XRD patterns of the synthesized Fe—Sn samples were collected using a Ge(111) analyzing crystal and a point detector at X14A beamline. The lattice parameters of the synthesized Fe—Sn samples were obtained by fitting the XRD data using software TOPAS-Academic V4.1 (Coelho Software, Brisbane, 2007). The wavelength is 0.77599 Å, and the estimated standard deviations for lattice constants a and c were 0.0001 Å and 0.0002 Å, respectively. The Fe—Sn samples were loaded in a glass capillary holder and XRD patterns were collected at different temperatures.

Figures 3A, 3B:
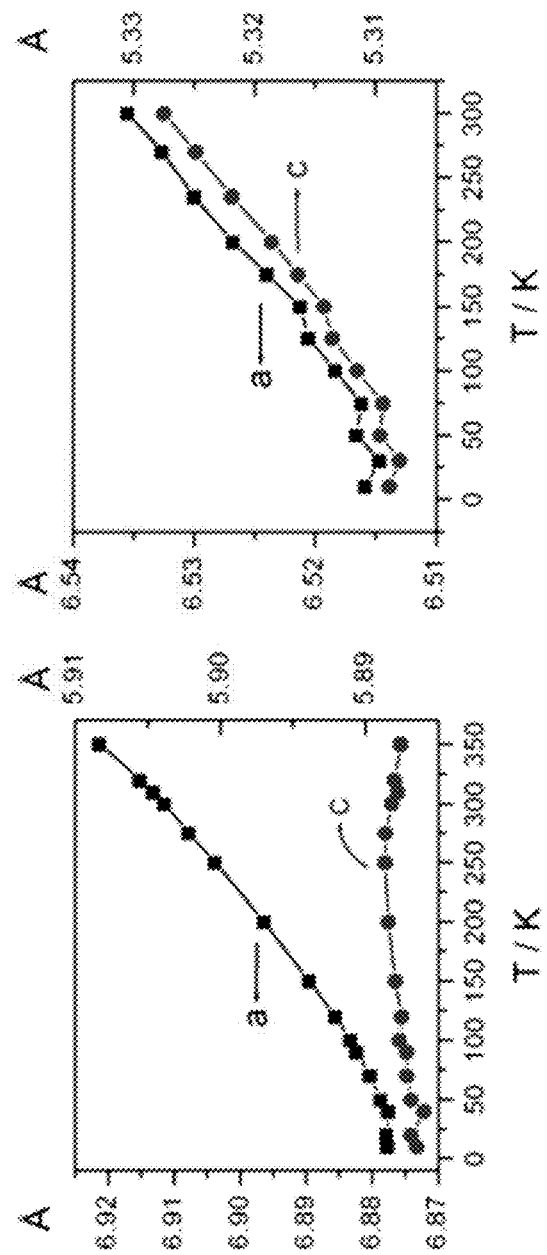
FIGS. 3A and 3B are plots that show the variation of lattice constants with temperature for $Fe_{0.74}Sn_5$ and $FeSn_2$, respectively.

The low-temperature synchrotron XRD experiments unveiled that the $Fe_{0.74}Sn_5$ lattice (also obtained by the same Rietveld refinement) expands, upon warming up, much more along the a-axis than along the c-axis, as shown in FIG. 3A. As a result, the tetragonality (indicated by c/a) increases monotonically with temperature. In contrast, the tetragonal $FeSn_2$ nanosphere system behaves quite differently as shown in FIG. 3B. Here, the a and c lattice constants expand at similar rates with increasing temperature, so there is no appreciable change in tetragonality. Without being bound by theory, it is believed that the anisotropic thermal expansion is based on the change in the tilt angle of inter-polyhedra in the crystal structures with temperature. In the case of $Fe_{0.74}Sn_5$, it is believed that the dramatically different dependence of lattice constants a and c on temperature is expected from its quasi-1D anisotropy. The relatively strong c-axis bonding would prevent phonon softening when thermal energy is trying to expand the unit cell. This explains why the slow growth of c was observed for the lattice constant variation data as illustrated in FIG. 3A.

$L1_0$ FePt, which has large magnetic anisotropy energy (MAE), also shows anisotropic thermal expansion. Its lattice consists of an ordered superstructure of Fe and Pt layers along c-axis; thus, the anisotropic expansion may again be caused by different bonding environments along the c-axis and in the a-b plane.

Example 4

A Hitachi S-4800 scanning electron microscope (SEM) and a JEM-2100F transmission electron microscope (TEM) with an energy dispersive X-ray spectroscopy (EDS) detector were used for the nanostructural characterization of the intermetallic $FeSn_5$ compound synthesized in Example 1. The EDS measurements were performed in the scanning TEM (STEM) mode with a spot size of 0.7 nm. Differential thermal analysis (DTA) was conducted using a Diamond TG/DTA instrument (Perkin Elmer). For SEM characterization, the Fe—Sn samples were deposited on the surface of silicon substrate. For TEM characterization, the Fe—Sn samples were deposited on copper grids. For DTA characterization, the Fe—Sn samples were loaded in alumina pans.

Figures 4A, 4B:
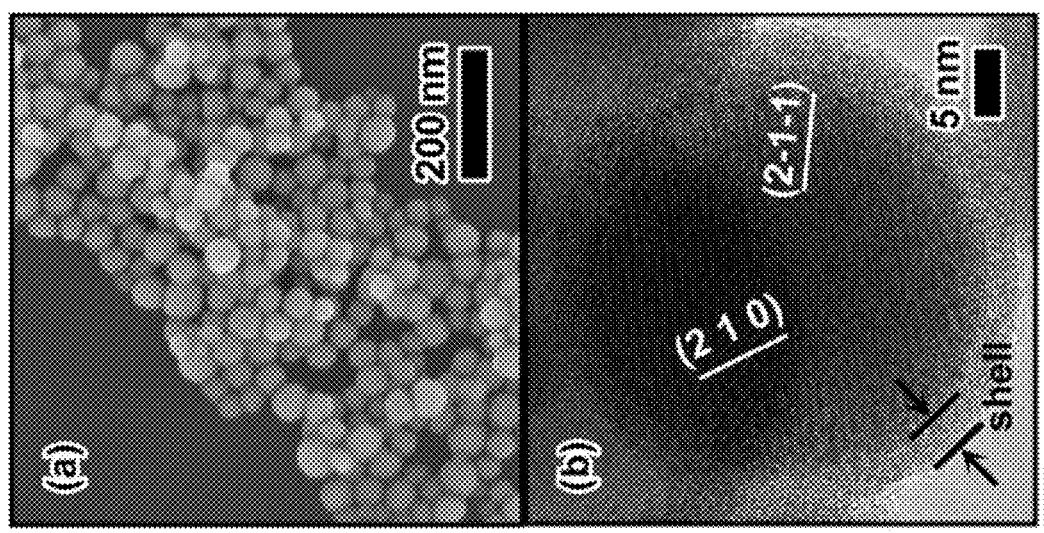
FIG. 4A is a scanning electron microscopy (SEM) image of $Fe_{0.74}Sn_5$ nanospheres.
FIG. 4B is a transmission electron microscopy (TEM) image of $Fe_{0.74}Sn_5$ nanospheres having a single-crystalline core with ordered fringes and a surface oxidized amorphous layer.

The synthesized $Fe_{0.74}Sn_5$ forms in uniform nanospheres with diameters determined from SEM measurements of 45±9 nm, similar to the tin templates (45±11 nm), as depicted in FIG. 4A. The room temperature densities of tin and $Fe_{0.74}Sn_5$, respectively, are 7.36 g cm$^{-3}$ and 7.48 g cm$^{-3}$. Therefore, it was found that a volume expansion of 5% accompanies the conversion of tin into $Fe_{0.74}Sn_5$. FIG. 4B shows a high resolution transmission electron microscopy (HRTEM) image of an exemplary single crystal nature of the $Fe_{0.74}Sn_5$ nanospheres. The ordered atomic arrangement is identical throughout the whole particle, without any indication of grain boundaries. Moreover, the particle is covered by an approximately 3-nm amorphous surface layer. The STEM-EDS detection with the spot size of 0.7 nm confirms the existence of Fe, Sn and O. Therefore, the $Fe_{0.74}Sn_5$ nanospheres possess a core-shell nanostructure built by a single crystalline intermetallic core and an amorphous Fe—Sn—O oxidized layer. Tin templates also have a similar single crystal core/amorphous shell nanostructure.

Example 5

Since the chemical ordering and the tetragonality of Fe/Pt alloy(s) have strong influence on its attractive magnetic properties, it was interesting to study the magnetic properties of the synthesized $Fe_{0.74}Sn_5$ nanostructures, because they have a characteristic quasi-1D structure and exhibit anisotropic thermal expansion. To explore the magnetic properties of the intermetallic nanoparticles fabricated in Example 1, temperature and field dependence of dc magnetization were measured at temperatures from 2K to 300K, and in a large magnetic field of 50 kOe, using the Quantum Design magnetic property measurement system (MPMS). At 300K to 850K, a vibrating sample magnetometer was employed in a Quantum Design physical property measurement system (PPMS). About 10 mg of nanoparticles were dispersed in paraffin, and contained in gelatin capsules fastened in plastic straws for immersion into the MPMS. For the high-temperature measurements in PPMS a gold foil was used to contain the sample. The diamagnetic signal from the paraffin and container was not subtracted from the magnetization data. The magnetization was normalized to the total mass of Fe atoms within each sample.

The field (H) and temperature (T) dependencies of the magnetization (M) of $Fe_{0.74}Sn_5$ and $FeSn_2$ nanospheres were measured with similar diameters (45±11 nm for $Fe_{0.74}Sn_5$ and 39±7 nm for $FeSn_2$). Both nanospheres were diluted in paraffin to minimize interparticle interactions for the low-temperature measurements. The magnetization measurements were carried out between 2.0K and 300K using a Quantum Design Magnetic Properties Measurement System (MPMS), and at higher temperatures between 300K and 1000K using a vibrating sample magnetometer (VSM) in a Quantum Design Physical Properties Measurement System (PPMS).

Figure 5:
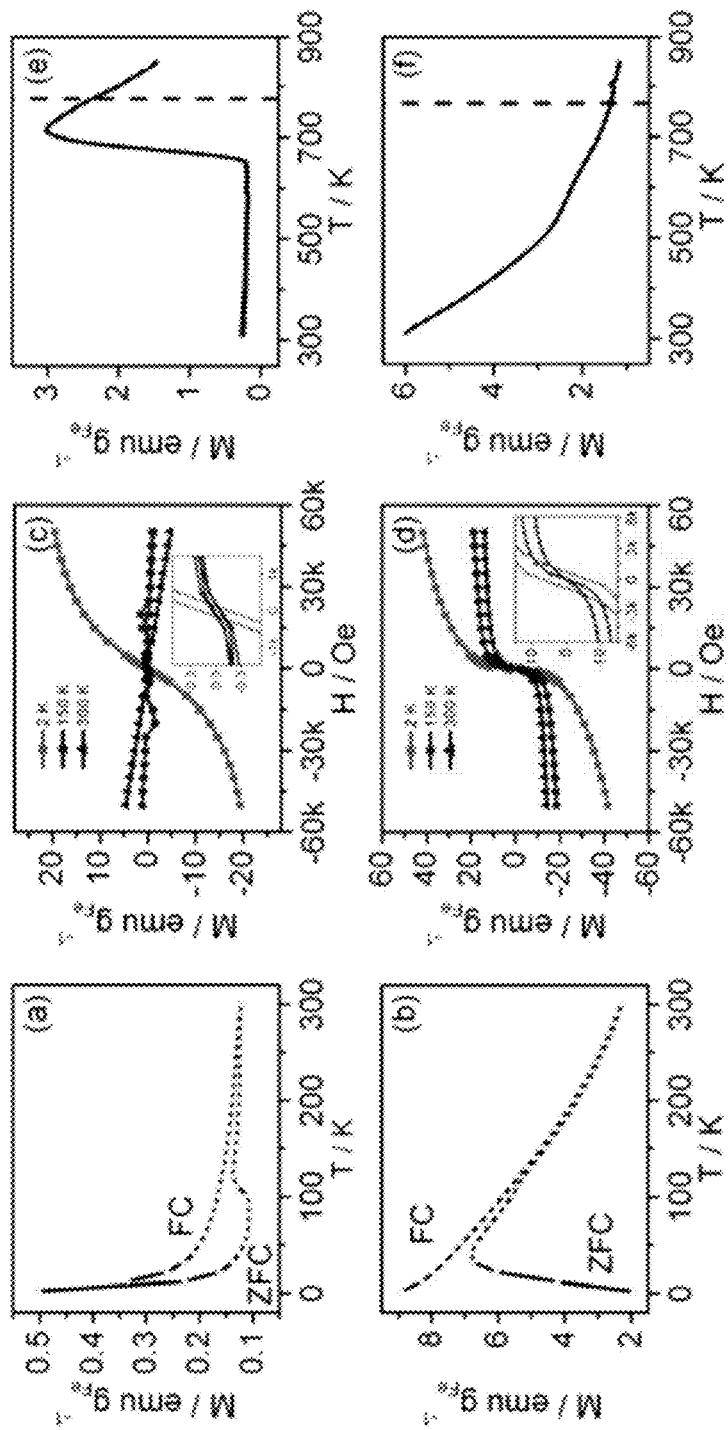
FIGS. 5A and 5B are plots that show the temperature dependencies of the zero-field-cooled (ZFC) and field-cooled (FC) magnetizations in applied fields of 500 Oe for $Fe_{0.74}Sn_5$ and $FeSn_2$ nanospheres, respectively.
FIGS. 5C and 5D are plots that show the magnetic field dependencies of the magnetizations for $Fe_{0.74}Sn_5$ and $FeSn_2$ nanospheres, respectively. The insets are expanded views of the same magnetizations but at lower fields.
FIGS. 5E and 5F are plots that show the high-temperature part of the ZFC magnetizations in an applied field of 1 kOe for $Fe_{0.74}Sn_5$ and $FeSn_2$ nanospheres, respectively. The dashed lines indicate the melting points determined from differential thermal analysis (DTA) measurements.

The temperature dependencies of M for $Fe_{0.74}Sn_5$ and $FeSn_2$ nanoparticles are illustrated in FIGS. 5A and 5B, showing the superparamagnetic behavior typical of small magnetic particles. M(T) was measured after cooling in zero field (ZFC) and after cooling in a field of 500 Oe (FC). Both are identical above the blocking temperature $T_B$, but separate at lower temperatures, indicating that there is an energy barrier $\Delta E$ proportional to $k_B T_B$ for the reorientation of a net nanoparticle moment that is much larger for $Fe_{0.74}Sn_5$ ($T_B$~300K) than for $FeSn_2$ ($T_B$~125K). Generally, $\Delta E$ depends on both the nanoparticle volume (V) and the magnetocrystalline anisotropy (K), so that $\Delta E$~KV. Since the outermost ~3 nm of the nanoparticles is amorphous, it does not contribute to the nanoparticle magnetization, which is ascribed entirely to the remaining 33-nm diameter core in $FeSn_2$ and 39 nm in $Fe_{0.74}Sn_5$. It was estimated that the $Fe_{0.74}Sn_5$ nanospheres have K=3.33 kJ $M^{-3}$, which is larger than the K=2.29 kJ $m^{-3}$ calculated for the $FeSn_2$ nanospheres. For equal nanoparticle dimensions, it is more difficult to reorient the entire moment of an $Fe_{0.74}Sn_5$ nanoparticle than that of an $FeSn_2$ nanoparticle. This probably is one reflection of the outstanding anisotropy $Fe_{0.74}Sn_5$ due to robust c-axis but weaker a-b plane bonding.

Example 6

The observation of superparamagnetic behavior in Example 5 implies that the nanoparticles include at least one component that orders magnetically, at or above room temperature. The field dependencies of the magnetization in $Fe_{0.74}Sn_5$ and $FeSn_2$ were measured at 2K, 150K, and 300K (see FIGS. 5C and 5D). In both cases, the magnetization is comprised of two temperature-dependent components. The first is reminiscent of a bulk ferromagnet, being highly nonlinear at low fields and saturating at high fields. A small coercive field of 180 Oe is found for $Fe_{0.74}Sn_5$ and a larger value of 750 Oe for $FeSn_2$, both at 2K. The magnitude of this ferromagnetic component of the magnetization shrinks with increasing temperature, vanishing completely above 2K for $Fe_{0.74}Sn_5$, but remaining substantial at temperatures at least as large as 300K for $FeSn_2$. The second component of the magnetization is linear in field, and is positive for both types of nanoparticles at 2K, and at higher temperatures becomes much weaker for $FeSn_2$ and even changes sign for $Fe_{0.74}Sn_5$. This linear magnetization is found in many magnetic nanoparticle systems, and is generally ascribed to uncompensated moments that cannot be saturated in field, located perhaps at the particle surface or at the core-shell interface. These uncompensated moments are presumably responsible for the large Curie tail that is evident in both the FC and ZFC M(T) for $Fe_{0.74}Sn_5$, and more weakly in $FeSn_2$, where it is present only in the FC magnetization.

The observation of superparamagnetic behavior in both $Fe_{0.74}Sn_5$ and $FeSn_2$ nanoparticles suggests that some parts or portions of each order at temperatures above 300K, however, the nature of this order is less understood in these multicomponent core-shell particles. For instance, surface atoms are responsible for the paramagnetic contribution in ferri- and ferromagnetic nanoparticles, while in antiferromagnetic nanoparticles the surface atoms instead are the source of a nonlinear contribution to the magnetization due to a complex magnetic structure with an uneven number of their sublattices.

Example 7

The measurements of the magnetization of the $Fe_{0.74}Sn_5$ and $FeSn_2$ nanoparticles above 300K were carried out to search for the onset of long-range ferromagnetic or antiferromagnetic order. Differential thermal analysis (DTA) was used to determine that the melting temperature $T_m$ is very similar in the two compounds, 776K±10K in $FeSn_2$ and 790K±14K in $Fe_{0.74}Sn_5$.

The high temperature magnetization has very similar properties in the two compounds as shown in FIGS. 5E and 5F. It decreases slowly as the temperature is raised above 300K, and a sharp peak is seen in $Fe_{0.74}Sn_5$ at 750K, just below the melting point. This peak is associated with the onset of antiferromagnetic order in the $Fe_{0.74}Sn_5$ cores. There is no overt sign of magnetic order in M(T) for $FeSn_2$, except several slope changes between 450K and 700K. Since magnetic blocking is observed in $FeSn_2$, and a saturating component of the magnetization is evident at temperatures as large as 300K, it was concluded that $FeSn_2$ orders antiferromagnetically above 300 K.

Example 8

The measurements described in Example 7 have revealed that $Fe_{0.74}Sn_5$ and $FeSn_2$ are mostly likely antiferromagnetic, but that the formation of a moment-bearing component via moment canting, sublattice formation, or uncompensated surface moments provides coupling to the external field. In both compounds, there is a component of the magnetization that saturates in low fields, below 300K in $FeSn_2$ (see FIG. 5D) and below 2K in $Fe_{0.74}Sn_5$ (see FIG. 5C). Since the ferromagnetic ground state is supposed to show noticeably large net moments and coercive field, the possibility of pure ferromagnetism can be ruled out. The only reasonable possibility is that the weak net moment results from canted antiferromagnetism. The uncompensated and paramagnetic moment is apparently much larger in $FeSn_2$, consistent with the lower Néel temperature, the smaller magnetocrystalline anisotropy K, and the smaller paramagnetic moment in the range of temperatures $T<T_B$ where the moments can be stabilized against thermal reorientation. Conversely, antiferromagnetic order is more robust in $Fe_{0.74}Sn_5$, and the uncompensated moment is much weaker.

Example 9

Figure 6:
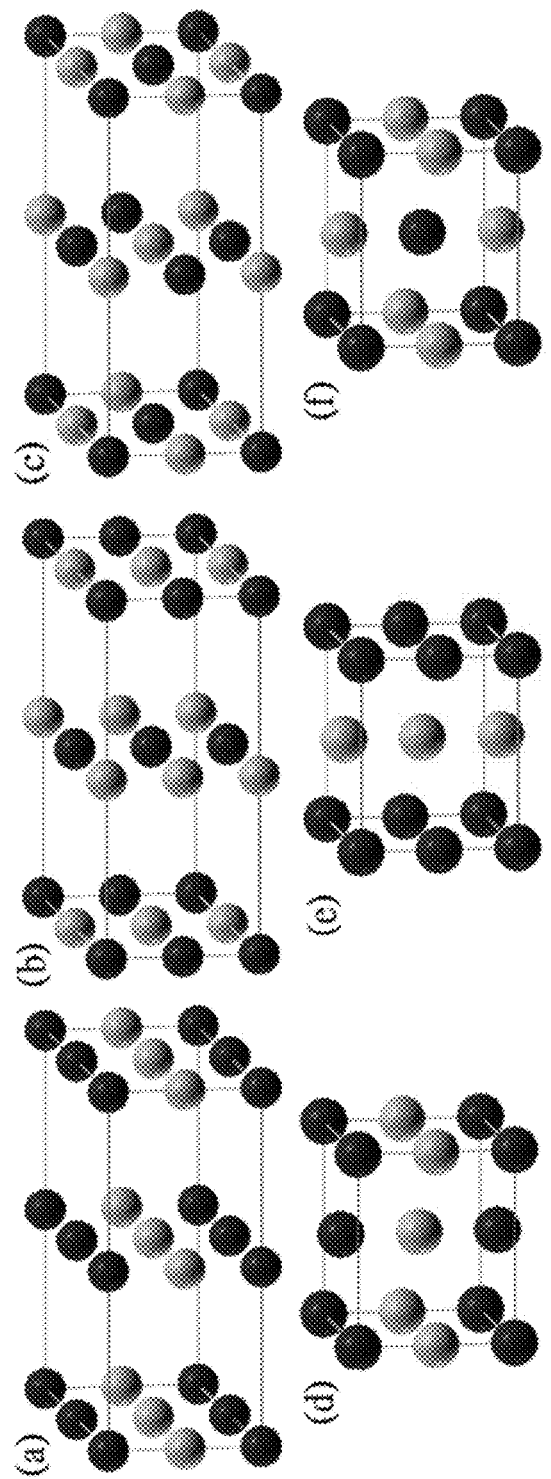
FIGS. 6A through 6F schematically illustrate the antiferromagnetic configurations considered in Table 2, where FIGS. 6A through 6C correspond to the 2nd to 4th rows in Table 2 and FIG. 6D through 6F correspond to the 6th to 8th rows.

First-principles density functional theory (DFT) calculations were carried out to gain additional insight into the magnetic characters of $FeSn_2$ and $Fe_{0.74}Sn_5$. Since the synthesized nanoparticles in Example 1 are relatively large, the finite size effects will provide only small corrections to the bulk electronic structures but not dramatically change the magnetic ground state. The total energy of various magnetic configurations was calculated and the results summarized in Table 2 (also see FIG. 6). For $FeSn_2$ and $FeSn_5$, the calculated electronic total energy of various magnetic configurations and (U, J) in the scheme of DFT with Hubbard U (LSDA+U) approach each other. All the energy values were relative to the non-magnetic configuration. One ferromagnetic and three mostly possible antiferromagnetic orders were chosen in the modeling. FM and AF in Table 2 stand for ferromagnetic and antiferromagnetic, respectively. Consistent qualitative trends were found for all the parameters sets.

TABLE 2

| | Magnetic configurations | | Electronic total energy/meV | | |
|---|---|---|---|---|---|
| Lowest energy state | In-plane (a-b plane) | Out-plane (c-axis) | U = 2 eV, J = 0.7 eV | U = 3 eV, J = 0.8 eV | U = 4 eV, J = 0.9 eV |
| $FeSn_5$ | FM | FM | −53.591 | −204.294 | −409.959 |
| | FM | AF | −130.416 | −327.490 | −592.195 |
| | AF | FM | −10.150 | −146.308 | −347.885 |
| ✓ | AF | AF | −144.855 | −348.975 | −612.639 |
| $FeSn_2$ | FM | FM | −268.073 | −392.197 | −580.011 |
| | FM | AF | −140.252 | −307.907 | −525.685 |
| ✓ | AF | FM | −329.747 | −505.486 | −711.986 |
| | AF | AF | −226.706 | −392.375 | −598.877 |

Interestingly, the results in Table 2 show that the lowest energy states in the bulk FeSn$_5$ and FeSn$_2$ are with antiferromagnetic correlation in the plane (a-b plane). FeSn$_2$ is found to have ferromagnetic correlations out of the plane (along the c-axis). On the other hand, FeSn$_5$ prefers antiferromagnetic correlation out of the plane. FIGS. 6C and 6E show the lowest energy states of Fe$_{0.74}$Sn$_5$ and FeSn$_2$ respectively. Also, FeSn$_5$ appears to have much weaker in-plane coupling from the small energy difference between the 2$^{nd}$ and the 4$^{th}$ rows in Table 2. This can be easily understood from the large in-plane Fe—Fe distance in the structure. Therefore, for Fe$_{0.74}$Sn$_5$, the magnetic structure is hard along the c-axis and soft in the a-b plane. This is also reminiscent of the hard, i.e., less expansive, c-axis and soft a-b plane during thermal expansion.

These theoretical results support the experimental observations presented in Examples 2-7. First, existing experiments on bulk FeSn$_2$ indicate that it is a canted antiferromagnet, and as explained in Example 6-8, it is likely to be similar for the nanoscale version of FeSn$_2$. While there are no measurements of the magnetization of bulk FeSn$_5$, both the theoretical results and measurements on nanoscaled Fe$_{0.74}$Sn$_5$ support the conclusion that it is also a canted antiferromagnet. Moreover, the relatively weak in-plane coupling of FeSn$_5$ leads to stronger in-plane spin fluctuation. The stronger in-plane spin fluctuation consequently accounts for the weaker coercive field, larger observed fluctuation moments, the coexistence of weak ferromagnetic hysteresis and antiferromagnetism, and much lower canted antiferromagnetic transition temperature at which the M-H curve with high nonlinearity at low fields and saturation at high fields starts to disappear.

Example 10

The cell performance of Fe$_{0.74}$Sn$_5$ nanospheres as an anode in Li-ion batteries was studied. The electrode films consisted of Fe$_{0.74}$Sn$_5$ nanospheres, carbon black (Super P Li, TIMCAL), and sodium carboxymethyl cellulose (CMC, Mw~90,000, Aldrich) binder with the weight composition of 80:10:10 on copper foils (0.025 mm thick, Schlenk). The composition of FeSn$_2$ electrode was FeSn$_2$ (64 wt %), carbon black (16 wt %) and poly(vinylidene fluoride) binder (PVDF, Alfa, 20 wt %). The electrolyte solution was 1.0 M LiPF$_6$ in ethylene carbonate/dimethyl carbonate (1:1 by volume, Novolyte). A Celgard 2320 membrane served as the separator. Laminated 2032-type coin cells with an electrode film/electrolyte-saturated separator/lithium foil (as the counter- and reference-electrode, 0.75 mm thick, 99.9% metal basis, Alfa) were fabricated inside an M. Braun LabMaster 130 glove box protected by argon atmosphere. Cycling was performed using an Arbin MSTAT system by a galvanostatic cycling procedure, with a voltage range of 0.05 V to 1.5 V and a current rate of C/20, i.e., the time for full charge or discharge of the theoretical capacity was 20 hours.

The Fe$_{0.74}$Sn$_5$ crystal lattice compound has a theoretical capacity of 929 mAh g$^{-1}$. The electrode reaction is Fe$_{0.74}$Sn$_5$+22Li$^+$+22e$^- \rightarrow$0.74Fe+Li$_{22}$Sn$_5$. The theoretical capacity (C) is calculated as C=Q/M, where Q is the charge involved in the reaction and M is the molecular weight of Fe$_{0.74}$Sn$_5$. It is the highest theoretical capacity to date for the reported M (electrochemically inactive)-Sn intermetallic anodes. The next one is the 852 mAh g$^{-1}$ for CoSn$_3$, and this is higher than most of the reported systems where M is active with exception of Mg$_2$Sn where Mg can form a solid solution with Li in Mg atomic percentage between 0% and ~70%. While NaSn$_6$ (962 mAh g$^{-1}$, inactive), K$_4$Sn$_{23}$ (940 mAh g$^{-1}$, inactive) and CaSn$_3$ (1028 mAh g$^{-1}$, active) have higher theoretical capacities, their application as anode materials has not yet been established.

Figure 7:
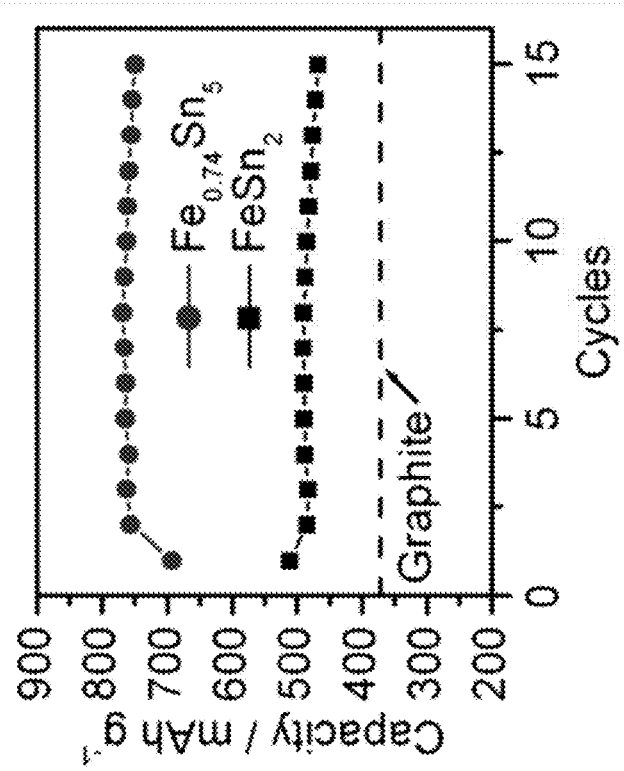
FIG. 7 is a plot that shows reversible capacities of $Fe_{0.74}Sn_5$ and $FeSn_2$ nanospheres as anodes in Li-ion batteries.

Because of the low (yet sufficient) Fe concentration, a higher capacity of Fe$_{0.74}$Sn$_5$ has been achieved as compared with that of FeSn$_2$. As shown in FIG. 7, the value stabilizes at around 750 mAh g$^{-1}$ for 15 cycles, while it is around 500 mAh g$^{-1}$ in the case of FeSn$_2$. The initial Coulomb efficiency also increases to 72% for Fe$_{0.74}$Sn$_5$ from 50% for FeSn$_2$. If the suppression of capacity is considered due to the presence of a surface oxidized layer (EDS analysis indicates that the Sn mass percentages in the nanospheres are 89.1% and 75.2% for Fe$_{0.74}$Sn$_5$ and FeSn$_2$ respectively) and assume that Sn in this layer is active, the theoretical capacities of these nanospheres become respectively 886 mAh g$^{-1}$ (Fe$_{0.74}$Sn$_5$) and 747 mAh g$^{-1}$ (FeSn$_2$). Therefore, Fe$_{0.74}$Sn$_5$ nanospheres can achieve 85% of its theoretical capacity, but FeSn$_2$ can realize only 67%. The capacity data also suggests that a second metal in the alloy electrode may be utilized for better cell performance.

All publications and patents mentioned in the above specification are herein incorporated by reference in their entireties. Various modifications and variations of the described nanomaterials and methods will be apparent to those skilled in the art without departing from the scope and spirit of the invention. Although the disclosure has been described in connection with specific preferred embodiments, it should be understood that the invention as claimed should not be unduly limited to such specific embodiments. Indeed, those skilled in the art will recognize, or be able to ascertain using the teaching herein and no more than routine experimentation, many equivalents to the specific embodiments of the invention described herein. Such equivalents are intended to be encompassed by the following claims.

The invention claimed is:

1. An intermetallic material comprising:
a tin (Sn)-based intermetallic compound having a formula (1)

$$M_{(1-x)}\text{-Sn}_5, \quad (1)$$

wherein a second metallic element (M) is selected from the group consisting of iron (Fe), copper (Cu), cobalt (Co), and nickel (Ni) and x ranges between about −0.1 and about 0.5, and wherein the tin (Sn)-based intermetallic material is a single crystal having a tetragonal lattice in the P4/mcc space group and is a nanosphere with a diameter of about 10 nm to about 500 nm, as measured across a shortest cross-section of the nanosphere.

2. The intermetallic material of claim 1, wherein x ranges between about 0.01 and about 0.4.

3. The intermetallic material of claim 1, wherein the lattice parameters of the crystal are a=b=6.91369 Å, c=5.88967 Å, and α=β=γ=90°.

4. The intermetallic material of claim 1, wherein the lattice parameters of the crystal are a=b=6.90567 Å, c=5.85077 Å, and α=β=γ=90°.

5. The intermetallic material of claim 1, wherein the tin (Sn)-based intermetallic compound is a canted antiferromagnet.

6. The intermetallic material of claim 1, further comprising alkali metals, transition metals, non-metals, or halogens.

7. The intermetallic material of claim 1, further comprising a core made from the tin (Sn)-based intermetallic compound having a formula (1) and a shell made from an amorphous structure of M-Sn—O surrounding the core.

8. An intermetallic material comprising:
a tin (Sn)-based intermetallic compound having a formula $Fe_{0.74}Sn_5$ or $Co_{0.63}Sn_5$.

9. An intermetallic material comprising:
a tin (Sn)-based intermetallic compound having a formula $Fe_{0.74}Sn_5$.

* * * * *